(12) United States Patent
Kim (10) Patent No.: US 6,746,210 B2
(45) Date of Patent: Jun. 8, 2004

(54) TURBOFAN AND MOLD USED TO MANUFACTURE THE SAME

(75) Inventor: Nam-Sung Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 112 days.

(21) Appl. No.: 10/209,932

(22) Filed: Aug. 2, 2002

(65) Prior Publication Data

US 2003/0198556 A1 Oct. 23, 2003

(30) Foreign Application Priority Data

Apr. 19, 2002 (KR) ........................................ 2002-21440

(51) Int. Cl.7 ............................................. F04D 29/28
(52) U.S. Cl. .................... 416/181; 416/186 R; 416/188
(58) Field of Search ................................. 416/181, 183, 416/186 R, 188, 195, 179, 182, 187, 234, 223 R, 223 A, 223 B; 415/204, 206

(56) References Cited

U.S. PATENT DOCUMENTS

| 4,647,271 | A | * | 3/1987 | Nagai et al. | ............ | 416/186 R |
| 6,224,335 | B1 | * | 5/2001 | Parisi et al. | ............ | 416/186 R |

OTHER PUBLICATIONS

Yamagishi Sakae et al., Patent Abstract Of Japan, "Fan Made Of Resin, Method For Monolithic Molding Thereof And Molding Die Therefor", Jan. 20, 1995.

* cited by examiner

Primary Examiner—Edward K. Look
Assistant Examiner—Richard A Edgar
(74) Attorney, Agent, or Firm—Staas & Halsey LLP (57) ABSTRACT

A turbofan and a mold used to manufacture the same, which enables the turbofan to be integrally molded by a single molding process. The turbofan has a rotating plate coupled to a shaft of a driving motor at its center, a plurality of blades radially disposed at and integrally formed with a periphery of the rotating plate, and a ring-shaped shroud integrally formed with front ends of the blades to face the rotating plate. The mold has a first mold part having a rear molding member to shape a rear portion of the rotating plate; a second mold part to be combined with the first mold part and having a front molding member to shape a front portion of the turbofan at an area corresponding to the rear molding member; a plurality of slide cores adapted to be radially moved to shape an inner surface of the shroud, outer portions of a front surface of the rotating plate, and outer surfaces of the blades; and a plurality of auxiliary cores extending to the inner surface of the shroud from the rear molding member of the first mold part to shape undercut portions of inner surfaces of the blades.

7 Claims, 10 Drawing Sheets

TURBOFAN AND MOLD USED TO MANUFACTURE THE SAME

CROSS-REFERENCE TO RELATED APPLICATIONS

This application claims the benefit of Korean Application No. 2002-21440, filed on Jul. 9, 2002, in the Korean Industrial Property Office, the disclosure of which is incorporated herein by reference.

BACKGROUND OF THE INVENTION

1. Field of the Invention

The present invention relates to a turbofan and a mold used to manfacture the same, and more particularly to a turbofan and a mold used to manfacture the same, which enables the turbofan to be integrally molded by a single molding process.

2. Description of the Prior Art

Figure 1:
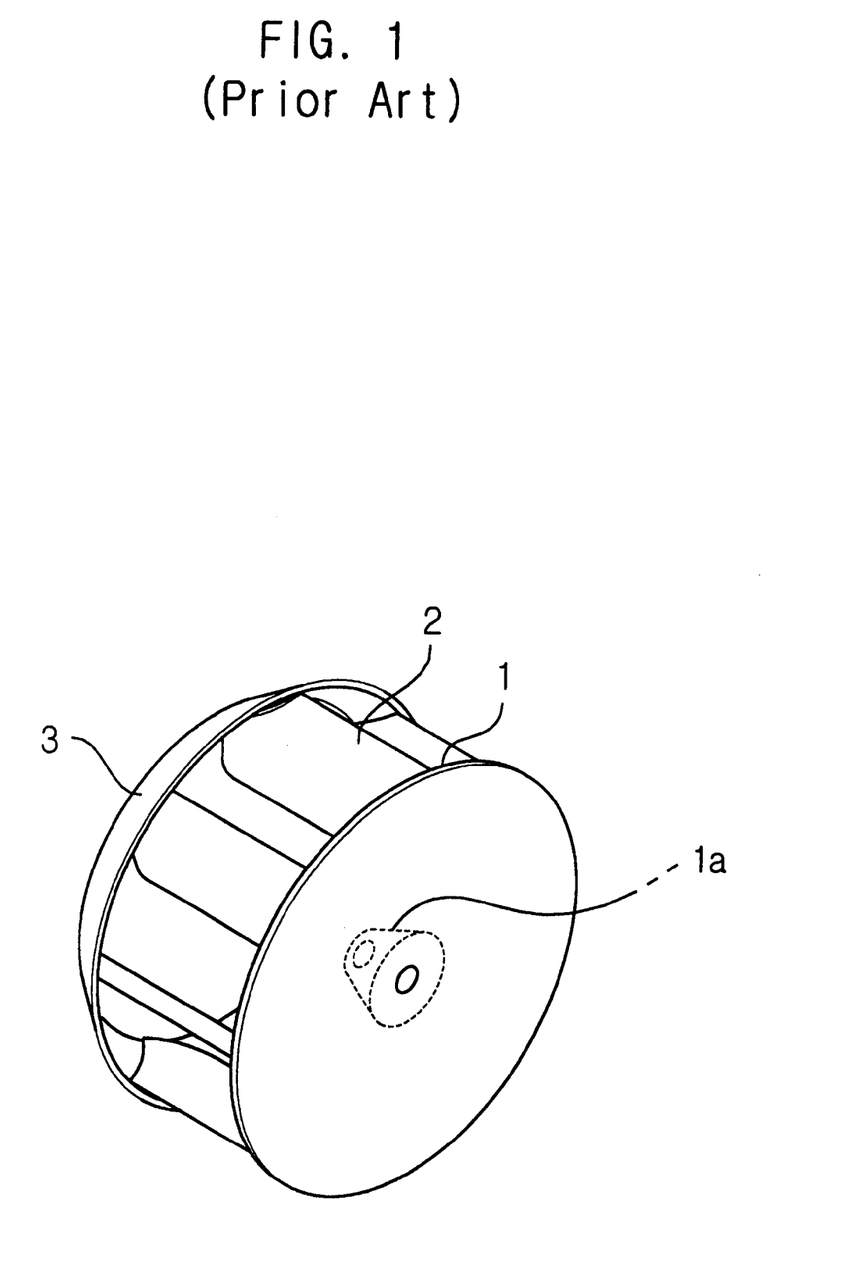
FIG. 1 is a perspective view of a conventional turbofan.

In general, a turbofan is a type of centrifugal fan, which is adapted to blow air by centrifugal force of the air generated from rotating blades. As illustrated in FIG. 1, such a turbofan comprises a circular rotating plate 1 having a central hub 1a to which a rotating shaft of a driving motor (not shown) is coupled, a plurality of blades 2 which are radially disposed at a periphery of the circular rotating plate 1 with regular intervals therebetween such that the blades 2 are positioned to be perpendicular to the rotating plate 1, and a ring-shaped shroud 3 coupled to free ends of the blades 2 to support the blades 2. In the turbofan, the plurality of blades 2 are orientated to be inclined by a certain angle with respect to respective tangential lines on the periphery of the rotating plate 1.

Figure 2:
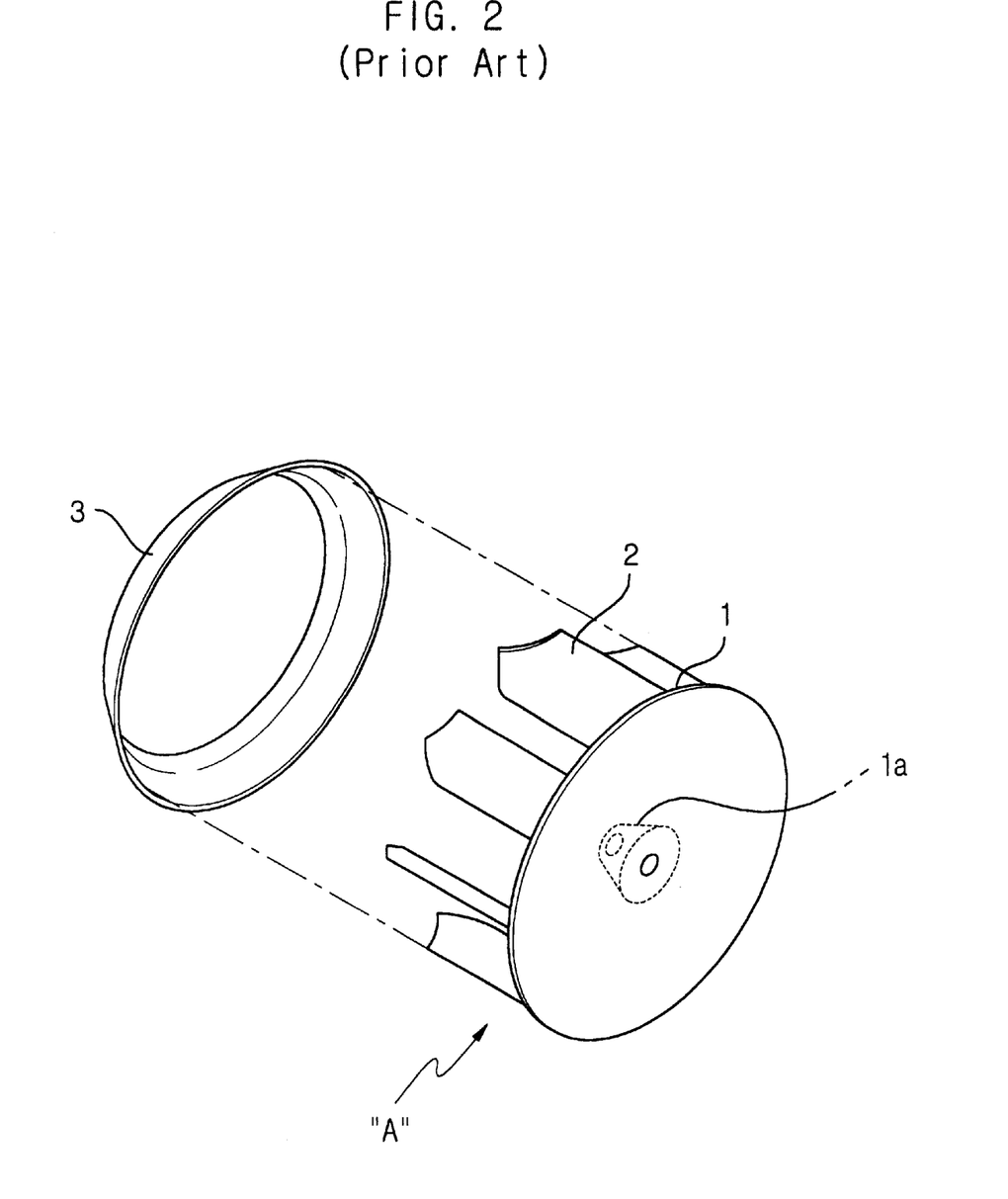
FIG. 2 is an exploded perspective view of the turbofan of FIG. 1.

The turbofan is usually produced by a plastic injection molding process. Because the turbofan is provided with a number of undercuts at its blades 2, which cause separation of a mold therefrom to be difficult, the turbofan is hard to integrally mold by only one molding process. To overcome this disadvantage, a conventional turbofan is produced in such a way that a component "A", in which a rotating plate 1 and blades 2 are integrally molded, and a shroud 3 are first molded by separate molds, and the component "A" and the shroud 3 are combined to each other by ultrasonic fusion or heat fusion in a subsequent procedure, as illustrated in FIG. 2.

However, since such conventional turbofans are produced by a process of molding a plurality of components in separate molds and joining the components together, productivity of the conventional turbofans is decreased due to the complicated manufacturing process. Furthermore, since the conventional process of manufacturing turbofans requires a plurality of molds for separate components, manufacturing cost is considerably increased due to production of the molds. In addition, since a plurality of components are joined to one another afterward, defective fraction of products is increased by poor assembly.

SUMMARY OF THE INVENTION

Accordingly, it is an object of the present invention to provide a turbofan and a mold used to manfacture the same which enables the turbofan to be integrally produced by only one molding process so as to improve productivity, to reduce manufacturing cost and to improve quality of products.

Additional objects and advantages of the invention will be set forth in part in the description which follows and, in part, will be obvious from the description, or may be learned by practice of the invention.

The foregoing and other objects of the present invention are achieved by providing a turbofan comprising: a rotating plate coupled to a shaft of a driving motor at its center; a plurality of blades which are radially disposed at and integrally formed with a periphery of the rotating plate; a ring-shaped shroud integrally formed with front ends of the blades to face the rotating plate; and a plurality of core holes formed at the rotating plate at an area corresponding to the shroud to allow cores to shape undercut portions of the blades to pass therethrough.

A radial width of each of the core holes may be equal to a radial width of the shroud, and each of the core holes may be shaped to have a triangular form.

An external diameter of the rotating plate may be larger than an external diameter of the shroud.

The foregoing and other objects of the present invention are also achieved by providing a mold used to manfacture a turbofan including a rotating plate coupled to a shaft of a driving motor at its center, a plurality of blades which are radially disposed at and integrally formed with a periphery of the rotating plate, and a ring-shaped shroud integrally formed with front ends of the blades to face the rotating plate, the mold comprising: a first mold part having a rear molding member to shape a rear portion of the rotating plate; a second mold part to be combined with the first mold part and having a front molding member to shape a front portion of the turbofan at an area corresponding to the rear molding member; a plurality of slide cores adapted to be radially moved to shape an inner surface of the shroud, outer portions of a front surface of the rotating plate, and outer surfaces of the blades; and a plurality of auxiliary cores extending to the inner surface of the shroud from the rear molding member of the first mold part to shape undercut portions of inner surfaces of the blades.

The front molding member of the second mold part may include an outer molding portion to shape a front surface of the shroud, a mediate molding portion to shape an inner edge of the shroud, and an inner molding portion to shape a front surface of the rotating plate, defined by an inner edge of the shroud.

The inner molding portion of the second mold part may be provided with a plurality of blade molding slits, which inwardly extend from its peripheral surface to shape the leading ends of the blades.

Each of the slide cores may be provided at its molding surface with a plurality of blade molding portions at its molding surface to shape outer surfaces of a plurality of adjacent blades concurrently.

The slide cores may be provided at either of the first and second mold parts to be radially moved, and the other of the first and second mold parts may be provided with a slanted pin inclined with respect to a moving direction of the second mold part to radially move the slide cores, one of the slide cores being provided with a slanted hole corresponding to the slanted pin.

Each of the auxiliary cores may be shaped to have a triangular form in section.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE INVENTION

Reference will now be made in detail to the embodiments of the present invention, examples of which are illustrated in the accompanying drawings, wherein like reference numerals refer to like elements throughout. The embodiments are described below in order to explain the present invention by referring to the figures.

This invention will be described in further detail by way of example with reference to the accompanying drawings.

Figure 3:
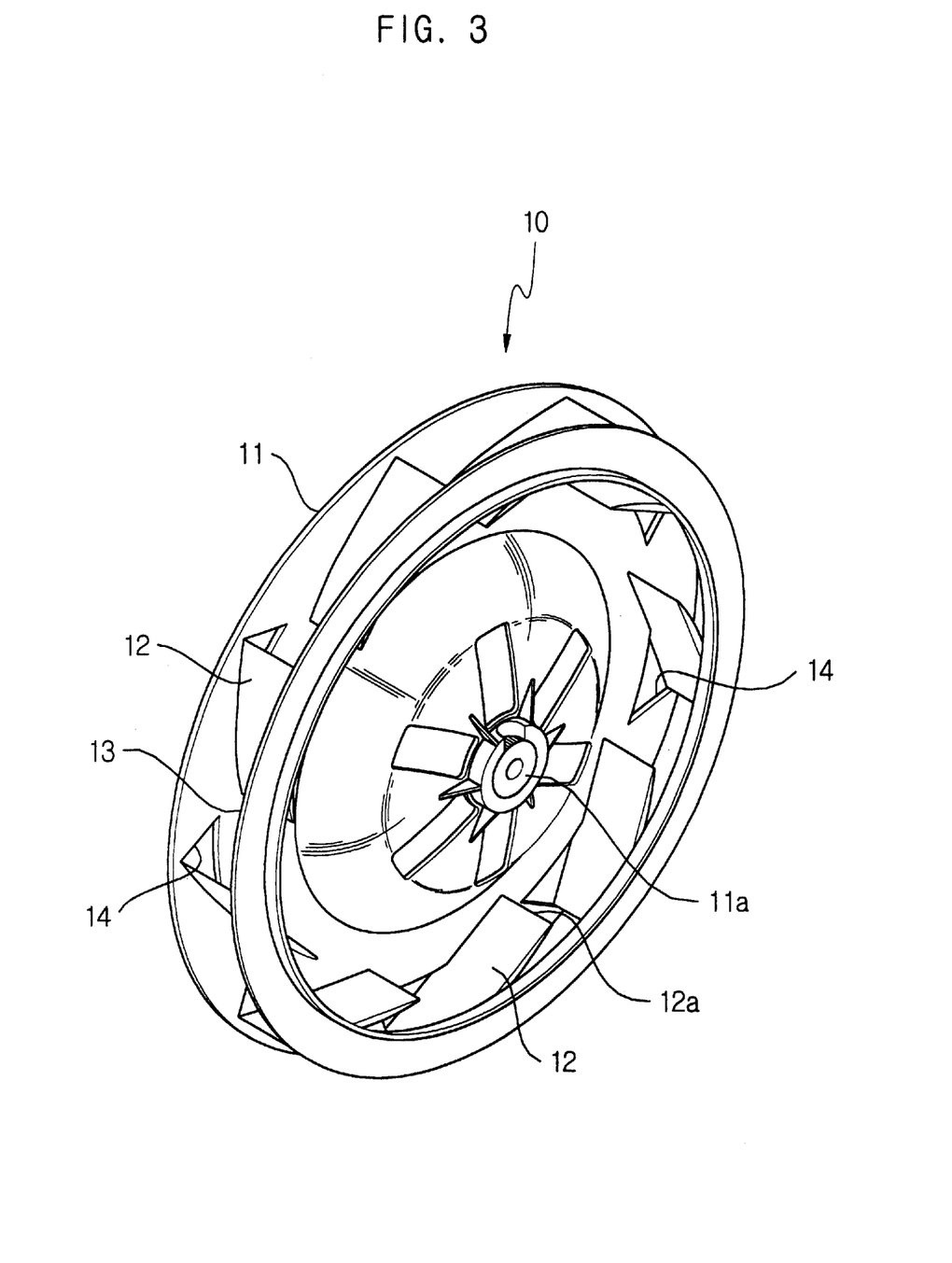
FIG. 3 is a perspective view of a turbofan according to an embodiment of the present invention.
Figure 4:
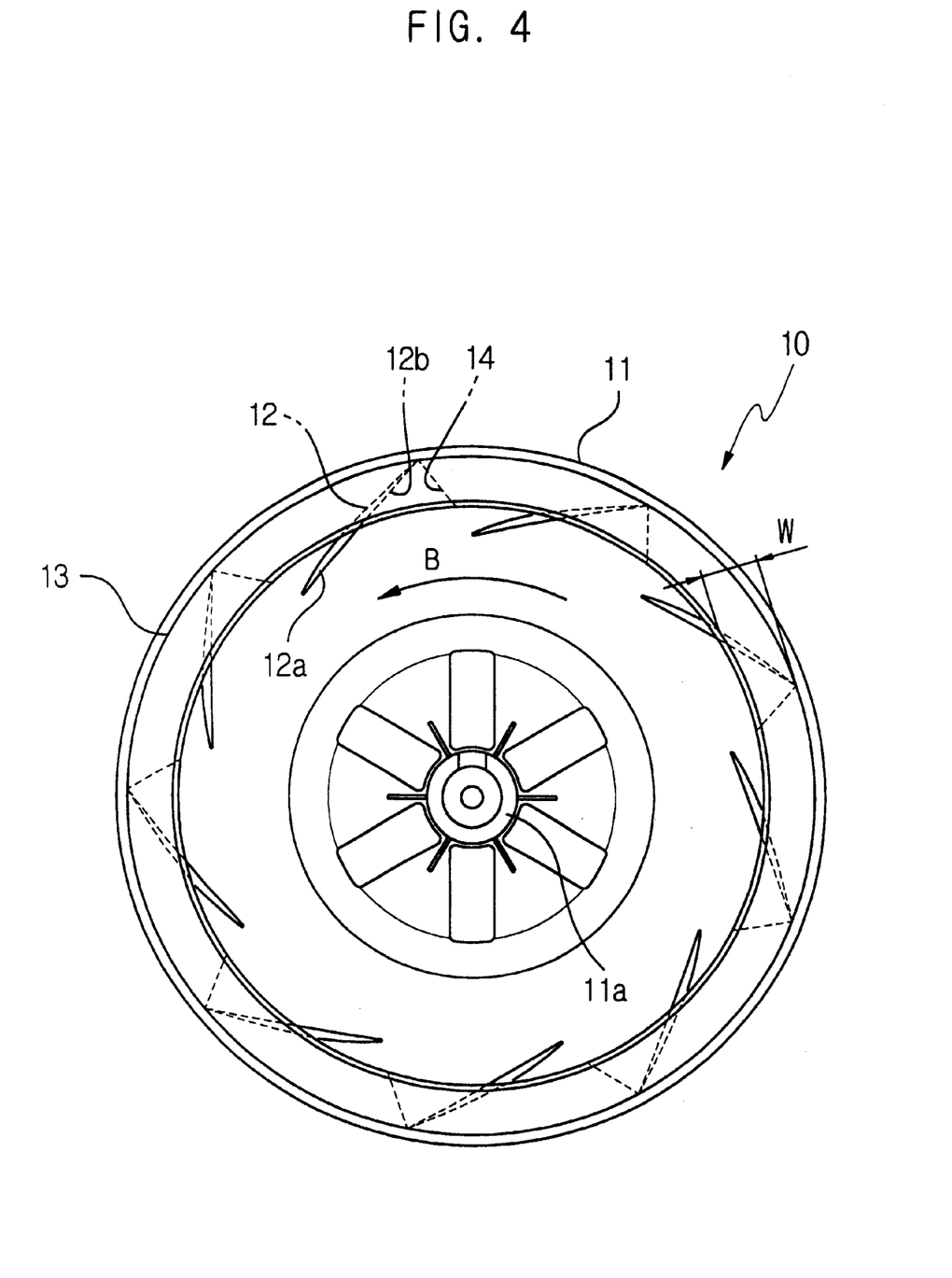
FIG. 4 is a plan view of the turbofan according to the embodiment of FIG. 3.

FIG. 3 is a perspective view illustrating a turbofan, which is integrally molded by a mold according to an embodiment of the present invention, and FIG. 4 is a plan view of the turbofan according to the embodiment of FIG. 3.

As illustrated in the drawings, the turbofan 10 according to an embodiment of the present invention includes a circular rotating plate 11 having a central hub 11a integrally formed therewith and to which a rotating shaft of a driving motor (not shown) is coupled, and a plurality of blades 12 radially disposed at and integrally formed with a periphery of the circular rotating plate 11. Furthermore, the turbofan 10 includes a ring-shaped shroud 13 integrally formed with front ends of the blades 12 to support the blades 12 and to guide airflow.

The rotating plate 11 having the central hub 11a forwardly protrudes in a hemispherical form at its center portion such that the turbofan 10 can be stably rotated in a state of being coupled to a driving motor (not shown). The plurality of blades 12 are arranged to be inclined at a certain angle with respect to the radial direction of the rotating plate 11. More specifically, the plurality of blades 12 are arranged such that respective blades 12 are outwardly inclined in the direction opposite to a rotating direction "B" of the turbofan 10, as illustrated in FIG. 4. Furthermore, the blades 12 are disposed such that leading ends 12a of the blades 12 relative to the rotating direction "B" are more inwardly protruding than an internal diameter of the shroud 13. This inward protrusion of the leading ends 12a of the blades 12 enhances blowing efficiency.

The turbofan 10 is provided with a plurality of core holes 14 at a region of the rotating plate 11 corresponding to the shroud 13 such that cores of the mold to shape undercut portions 12b of the blades 12 can pass through the core holes 14 in an injection molding process. The core holes 14 are provided to permit the cores of the mold to pass therethrough and to reach an inner surface of the shroud 13, thereby improving moldability of the blades 12 and simplifying the configuration of the mold. To compensate for weakening in rigidity of the peripheral portion of the rotating plate 11 caused by the core holes 14, the rotating plate 11 is sized such that an external diameter of the rotating plate 11 is larger than an external diameter of the shroud 13.

The core holes 14 of the rotating plate 11 are configured such that a radial width of each of the core holes 14 is equal to a radial width of the shroud 13. In addition, each of the core holes 14 of the rotating plate 11 is preferably configured to have a triangular shape so as to afford simplification of a molding process and a structure of a mold. The core holes 14 are minimized in their size to prevent deterioration of blowing efficiency due to the core holes 14 and to enable the complicated peripheral portion of the turbofan 10 to be easily molded by simplification of a mold. A more specific explanation relating to the core holes will be disclosed hereinafter with reference to a configuration of a mold.

FIGS. 5 to 8 illustrate a mold according to an embodiment of the present invention to produce the above-described turbofan 10. As illustrated in the drawings, the mold according to an embodiment of the present invention includes a first stationary mold part 20, and a second movable mold part 40 which is adapted to be moved with respect to the first mold part 20 to be combined with or separated from the first mold part 20.

Figure 5:
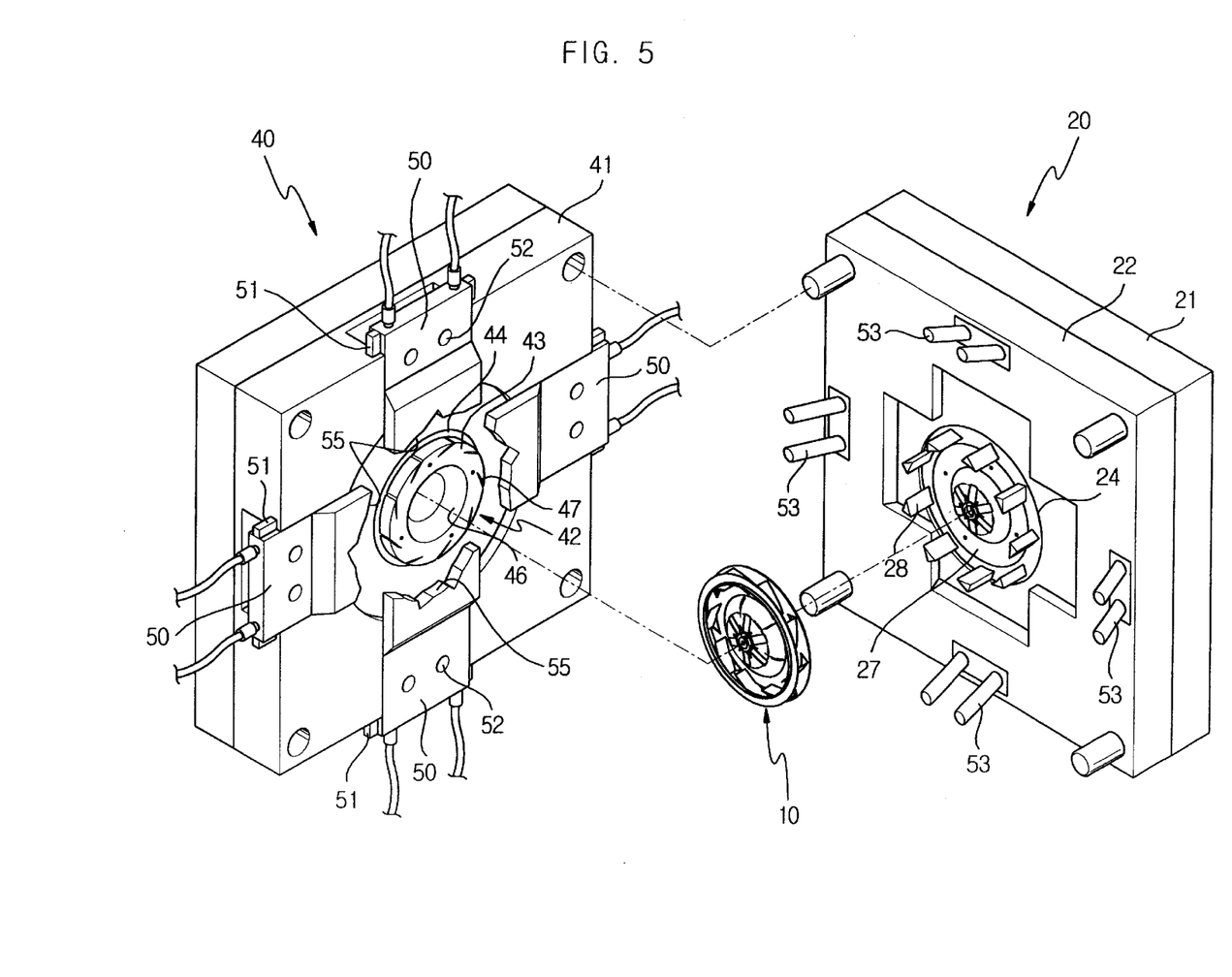
FIG. 5 is a perspective view of a mold used to manfacture a turbofan according to another embodiment of the present invention.
Figure 6:
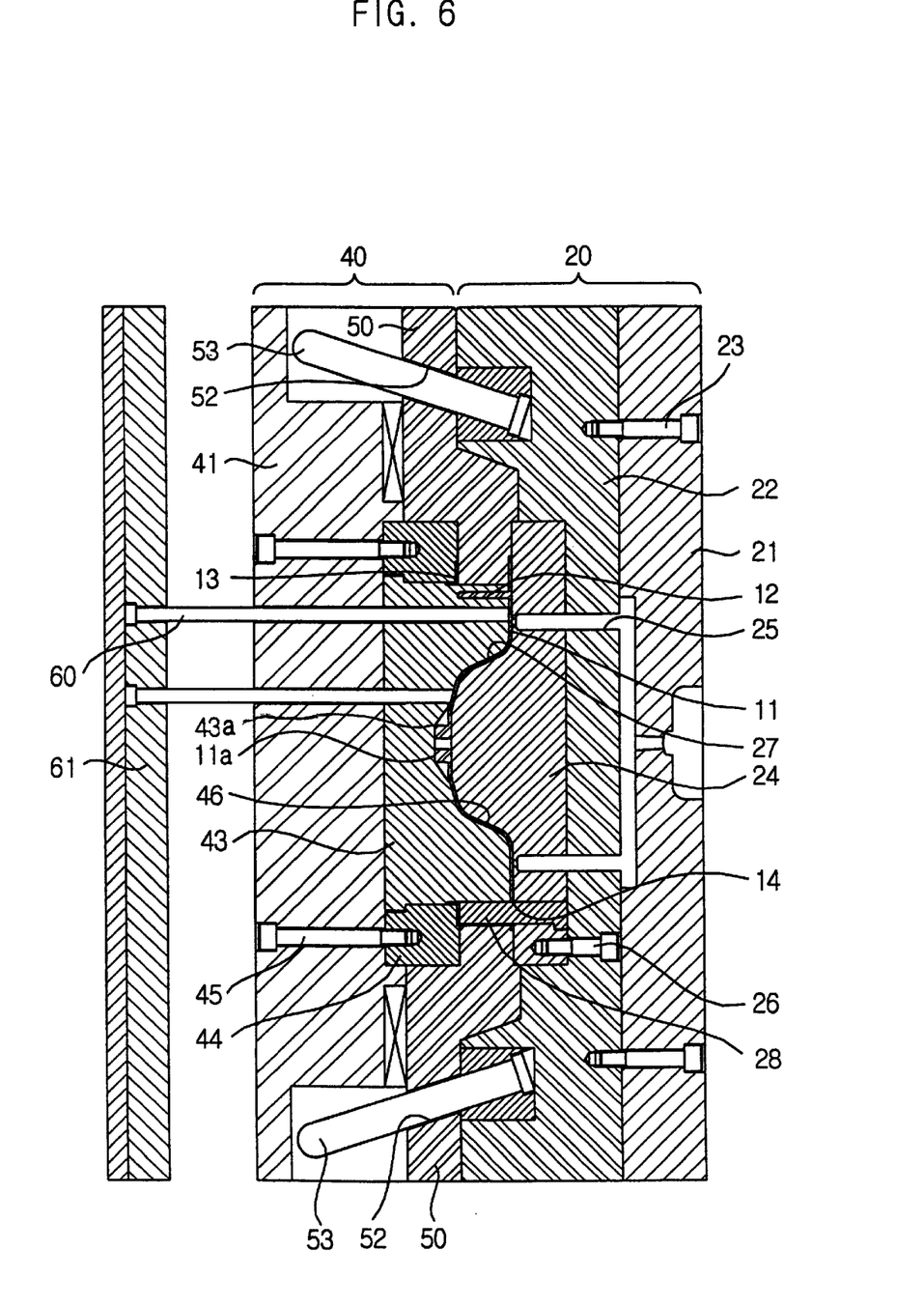
FIG. 6 is a cross-sectional view of the mold according to the embodiment of FIG. 5, in which a pair of mold parts are combined with each other.

The first mold part 20 includes first and second fixed molding plates 21 and 22 which are combined with each other by fastening bolts 23, and a rear molding member 24 provided at the center region of the second fixed molding plate 22 facing the second mold part 40 to mold a rear part of the turbofan 10. The first and second fixed molding plates 21 and 22 and the rear molding member 24 are formed with runners 25 to supply molten material therethrough. The rear molding member 24 is centrally fixed to the second fixed molding plate 22 by fastening bolts 26. The rear molding member 24 is provided with a rear molding portion 27 at its center, which protrudes at the center area and is flattened around the protrusion to shape a rear surface of the rotating plate 11 of the turbofan 10.

The rear molding portion 27 of the first mold part 20 is provided with a plurality of auxiliary cores 28 at its peripheral area, which are projected toward the second mold part 40 to shape inner surfaces of the blades 12 of the turbofan. Each of the auxiliary cores 28 comprises a triangular prism in consideration of a shape of the blade 12 and separation of mold parts, and projects toward the second mold part 40 to reach an inner surface of the shroud 13.

The second mold part 40 includes a movable molding plate 41 which is adapted to be moved back and forth to be combined with the first mold part 20, a front molding member 42 provided at the center of the movable molding plate 41, which is adapted to mate with the rear molding member 24 of the first mold part 20 to shape a front surface of the turbofan 10, and a plurality of slide cores 50 provided at the movable molding plate 41, which are radially movable to shape outer portions of the blades 12 of the turbofan 10.

Figure 7:
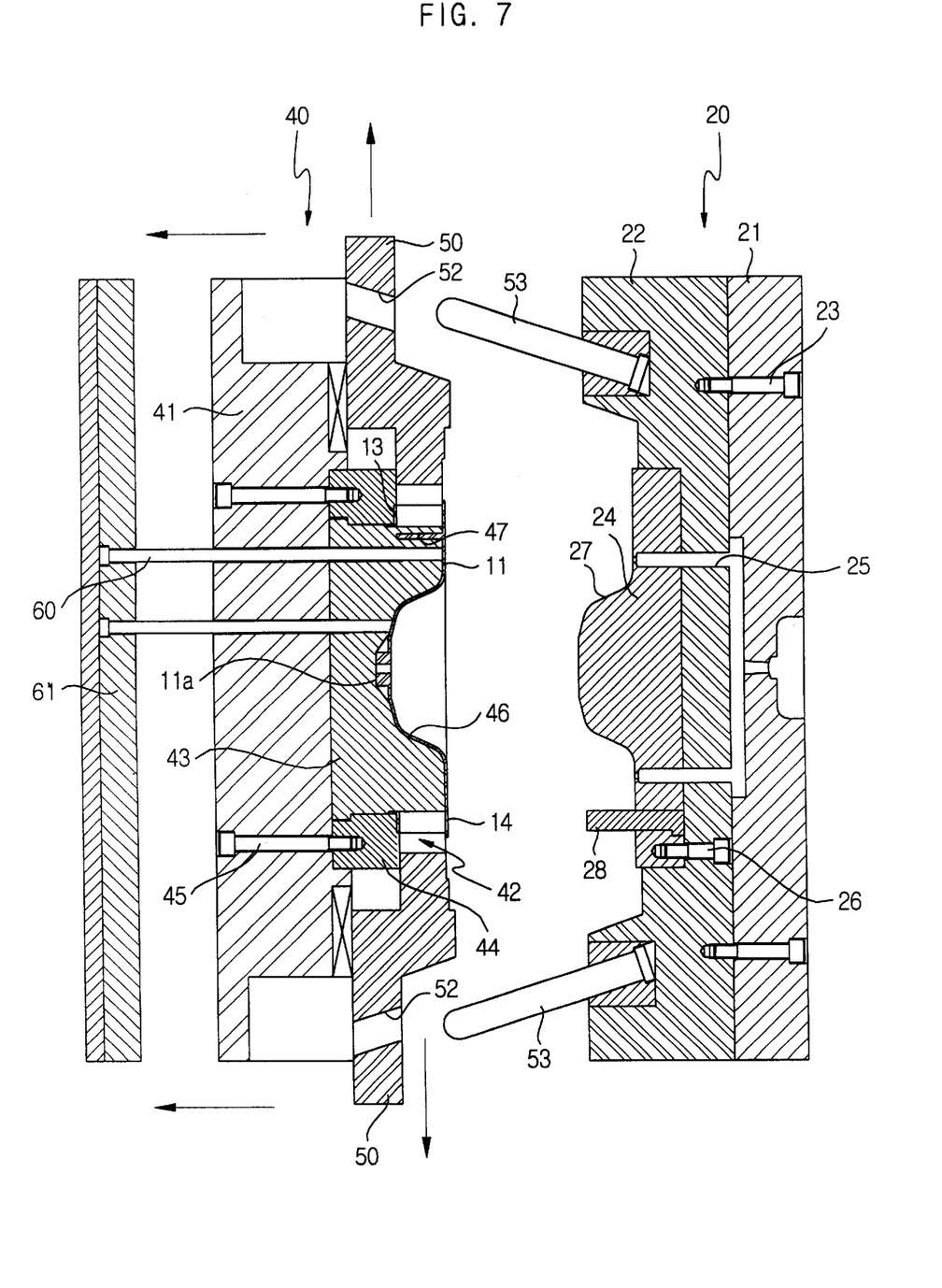
FIGS. 7 and 8 are cross-sectional views of the mold according to the embodiment of FIG. 5, which illustrate an operation of separating the mold parts.
Figure 8:
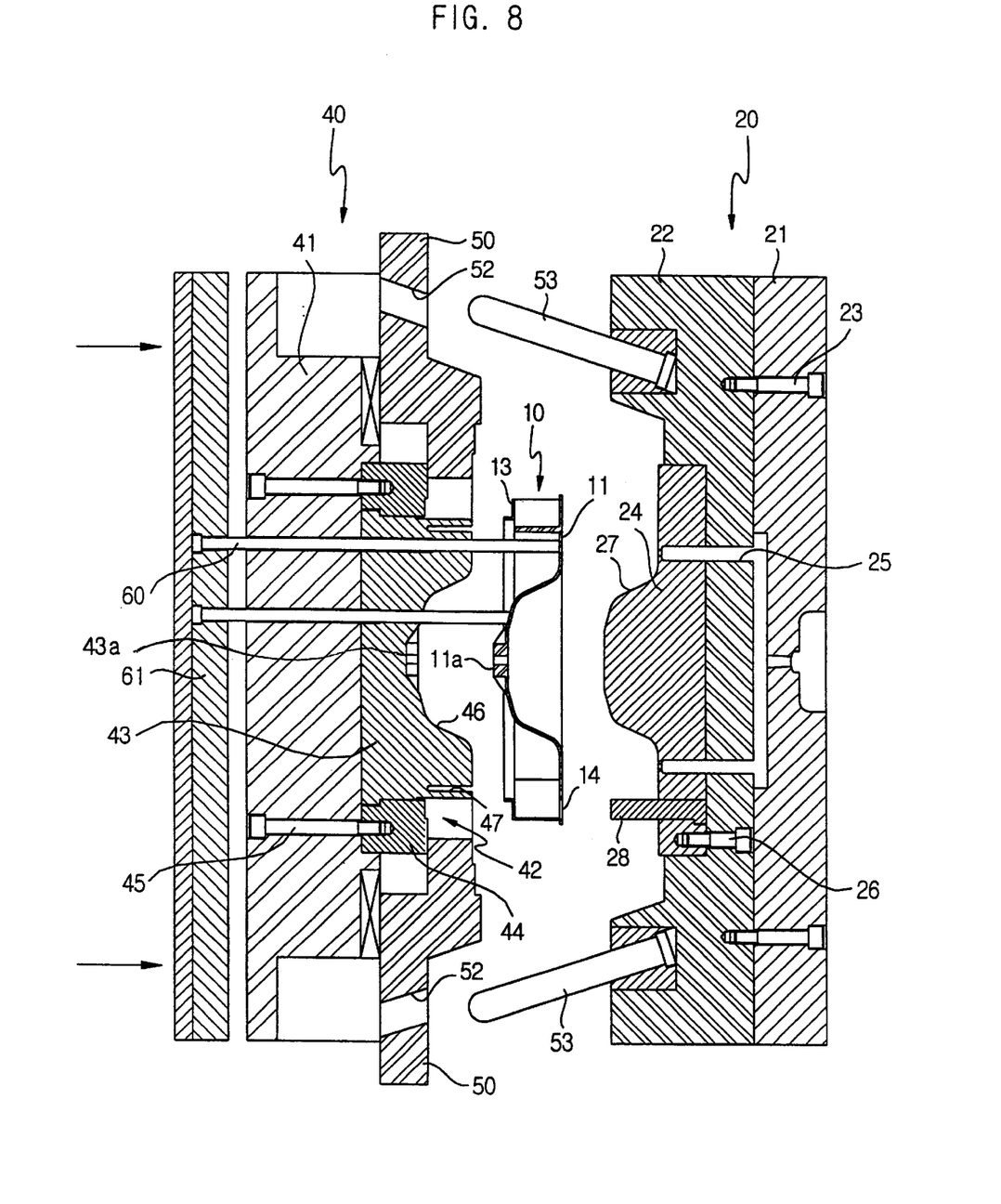

As illustrated in FIGS. 6 to 8, the front molding member 42 includes an inner molding member 43 which is provided at the center of the movable molding plate 41 to shape an inner surface portion of the shroud 13 and a front surface portion of the rotating plate 11 defined by an internal diameter of the shroud 13, and an outer molding member 44 which is provided at the movable molding plate 41 around the inner molding member 43 to support the inner molding member 43 and to shape a front surface of the shroud 13. The inner molding member 43 is centrally provided with a depressed portion 43a to shape the hub 11a of the rotating plate 11, and is radially provided with a plurality of blade molding slits 47, which inwardly and obliquely extended from its peripheral surface to shape the leading ends of the blades 12. The front molding member 42 is intended to shape a front portion of the turbofan 10 by the inner and outer molding members 43 and 44.

The plurality of slide cores 50 serve to shape a circumferential portion of a front surface of the rotating plate 11 and outer surfaces of the blades 12 positioned under and inside the shroud 13 in conjunction with the auxiliary cores 28 of the first mold part 20. As illustrated in FIG. 5, the slide cores 50 are disposed in slide rails 51 formed at four sides of the movable molding plate 41 to be radially moved. The second fixed molding plate 22 of the first mold part 20 is provided with slanted pins 53, which are inclined with respect to a separating direction of the second mold part 40, such that the slide cores 50 are radially moved when the first and second mold part 20 and 40 are combined together or separated from each other. The slide cores 50 are formed with slanted holes 52 in which the slanted pins 53 are inserted.

Figure 9:
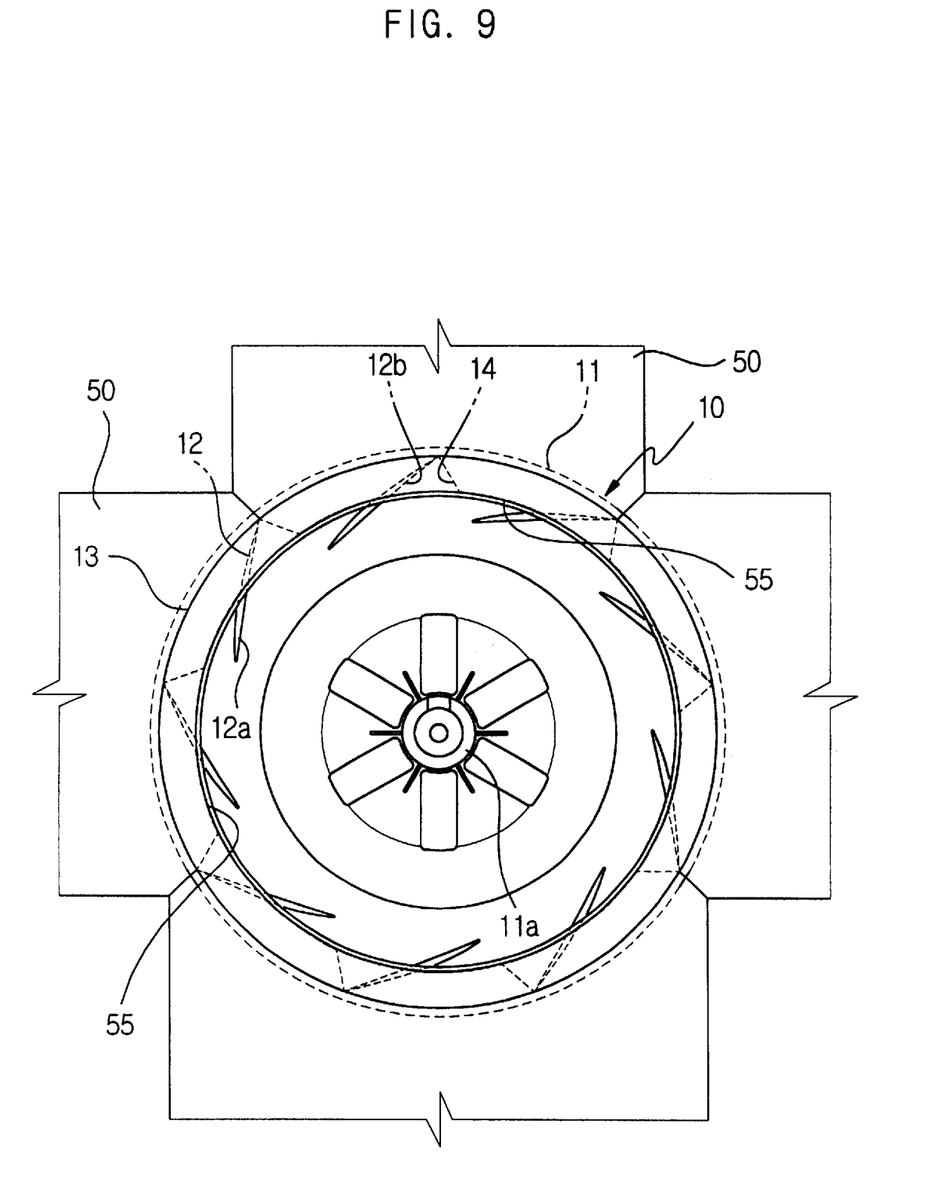
FIG. 9 is a plan view illustrating slide cores of the mold according to the embodiment of FIG. 5, which are assembled together.
Figure 10:
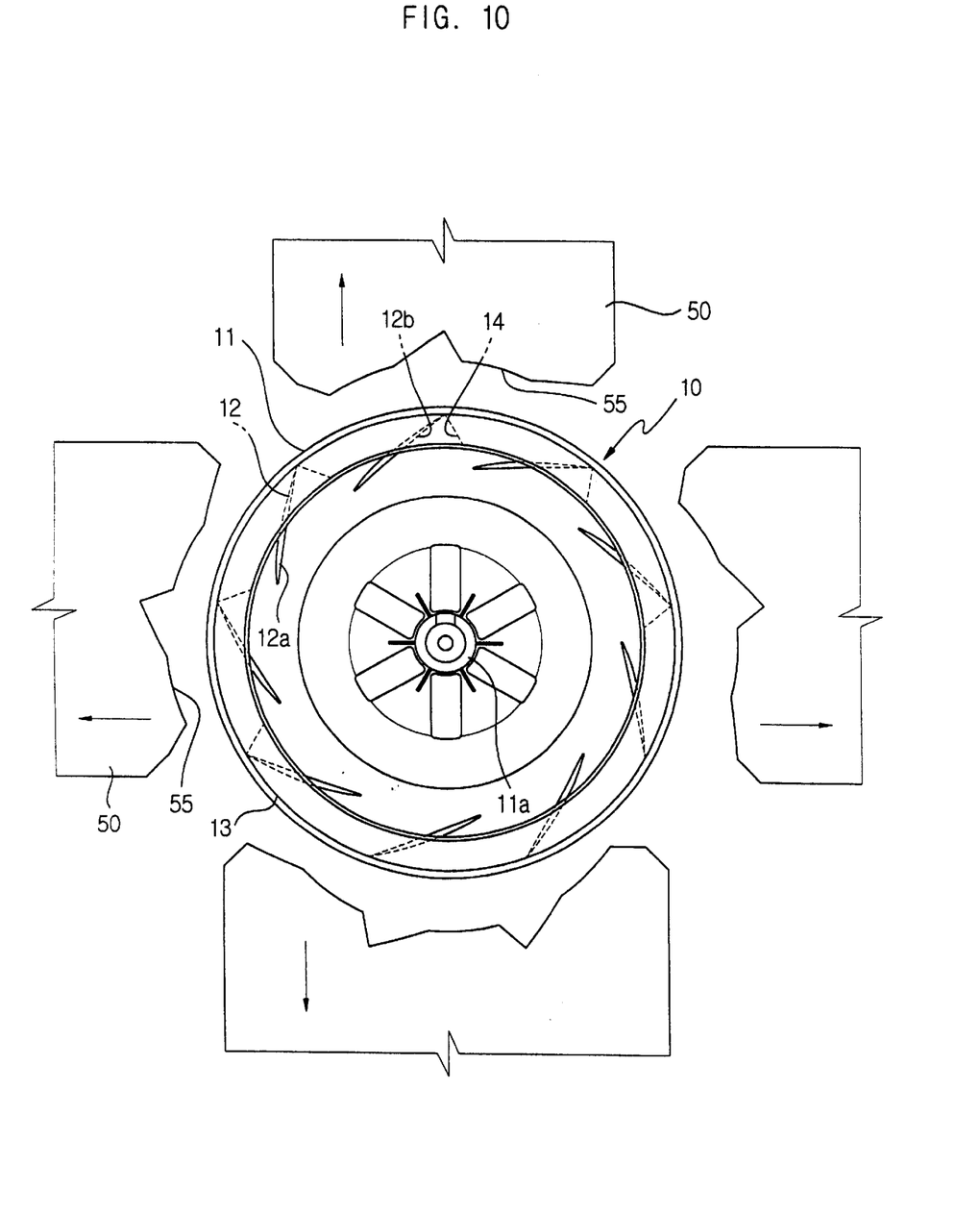
FIG. 10 is a plan view illustrating the slide cores of the mold according to the embodiment of FIG. 5, which are separated from one another.

As illustrated in FIGS. 9 and 10, each of the slide cores 50 is provided with a plurality of blade molding faces 55 at its inner surface, so that the plurality of blades 12 can be molded by only one slide core 50. Accordingly, by this configuration of the four slide cores 50, a number of blades 12 can be molded at a time. In this embodiment, nine blades 12, which are radially disposed with a regular spacing therebetween, can be molded by the four slide cores 50 at a time. Since the blade molding faces 55 of the slide cores 50 define a molding space from which the auxiliary cores 28 of the first mold part 20 are removed, the slide cores 50 can be simplified in their configurations even if the blades 12 have complicated shapes. Furthermore, the mold according to this embodiment enables the first and second mold parts to be combined with or separated from each other only by radial movement of the slide cores 50. Since the blade molding faces 55 of the slide cores 50 are configured to be more inwardly extending from the internal diameter of the shroud 13 when the first and second mold parts 20 and 40 are combined with each other, the blade molding faces define molding spaces for the blades 12 in conjunction with the inner molding member 43 of the front molding member 42 and the auxiliary cores 28.

As illustrated in FIG. 8, the second mold part 40 includes a plurality of eject pins 60 to remove the turbofan 10 from the mold after a molding process of the turbofan 10 is completed, and an eject plate 61 which can be moved back and forth within a certain distance to push the molded turbofan 10. The plurality of eject pins 60 rearwardly project through the movable molding plate 41 and the front molding member 42.

A process of molding the turbofan by the mold according to an embodiment of the present invention will now be described.

As illustrated in FIG. 6, when the first mold part 20 and the second mold part 40 are combined with each other, the rear molding member 24 and the auxiliary cores 28 of the first mold part 20 and the front molding member 42 and the plurality of slide cores 50 of the second mold part 40 are assembled together to define a molding space for the turbofan 10. In particular, the auxiliary cores 28 define portions of inner surfaces of the blades 12 positioned under the shroud 13 while the plurality of slide cores 50 define portions of outer surfaces of the blades 12 positioned under the shroud 13, as illustrated in FIG. 9. Thereafter, molten resin is filled in the molding space through the runners 25 of the first mold part 20, and then solidified, thus completing the turbofan 10.

To remove the molded turbofan 10 from the mold, the second mold part 40 is separated from the first stationary mold part 20, as illustrated in FIG. 7. At this time, the rear molding member 24 and the auxiliary cores 28 of the first mold part 20 are first separated from the molded product 10. Therefore, the molded turbofan 10 still remains in a state of being coupled to the second mold part 40. The slide cores 50 are radially and outwardly moved and thus separated from the molded turbofan 10 by cooperation between the slanted pins 52 and the slanted holes 52 while the second mold part 40 is separated from the first mold part 20. More specifically, when the second mold part 40 is separated from the first mold part 20, the slide cores 50 are outwardly moved along the slide rails 51 while being guided along the slanted pins 53 fixed to the first mold part 20.

Subsequently, the eject pins 60 push the molded turbofan 10 while advancing toward the first mold part 20 by action of the eject plate 61, thereby allowing the molded turbofan 10 to be easily separated from the second mold part 40, as illustrated in FIG. 8.

As described above, the present invention provides a mold for a turbofan which is capable of integrally molding a complicated turbofan in a single operation, thereby affording improvement of productivity, remarkable reduction of manufacturing cost, and production of a high quality turbofan.

In addition to the above-mentioned advantages, since the mold according to an embodiment of the present invention enables inner surfaces of blades to be shaped by a plurality of auxiliary cores, thereby simplifying configuration and motion of slide cores, turbofans having complicated blades can be integrally molded and overall structure of the mold can be simplified.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A turbofan comprising:
    a rotating plate coupled to a shaft of a driving motor at a center thereof;
    a plurality of blades radially disposed at and integrally formed with a periphery of the rotating plate;
    a ring-shaped shroud integrally formed with front ends of the blades to face the rotating plate; and
    a plurality of core holes formed at the rotating plate at an area corresponding to the shroud to allow cores to shape undercut portions of the blades to pass therethrough.

2. The turbofan as set forth in claim 1, wherein a radial width of each of the core holes is equal to a radial width of the shroud.

3. The turbofan as set forth in claim 1, wherein each of the core holes is shaped in a triangular form.

4. The turbofan as set forth in claim 1, wherein an external diameter of the rotating plate is larger than an external diameter of the shroud.

5. The turbofan as set forth in claim 1, wherein the plurality of blades are arranged such that respective blades are outwardly inclined in a direction opposite to a rotating direction of the turbofan.

6. The turbofan as set forth in claim 1, wherein the plurality of blades are disposed such that leading ends of the blades relative to a rotating direction are more inwardly protruding than an internal diameter of the shroud.

7. A turbofan comprising:
a rotating plate coupled to a shaft of a driving motor at its center;
a plurality of blades radially disposed at and integrally formed with a periphery of the rotating plate; and
a ring-shaped shroud integrally formed with front ends of the blades to face the rotating plate;
wherein an external diameter of the rotating plate is larger than an external diameter of the shroud.

* * * * *